Patented Feb. 9, 1926.

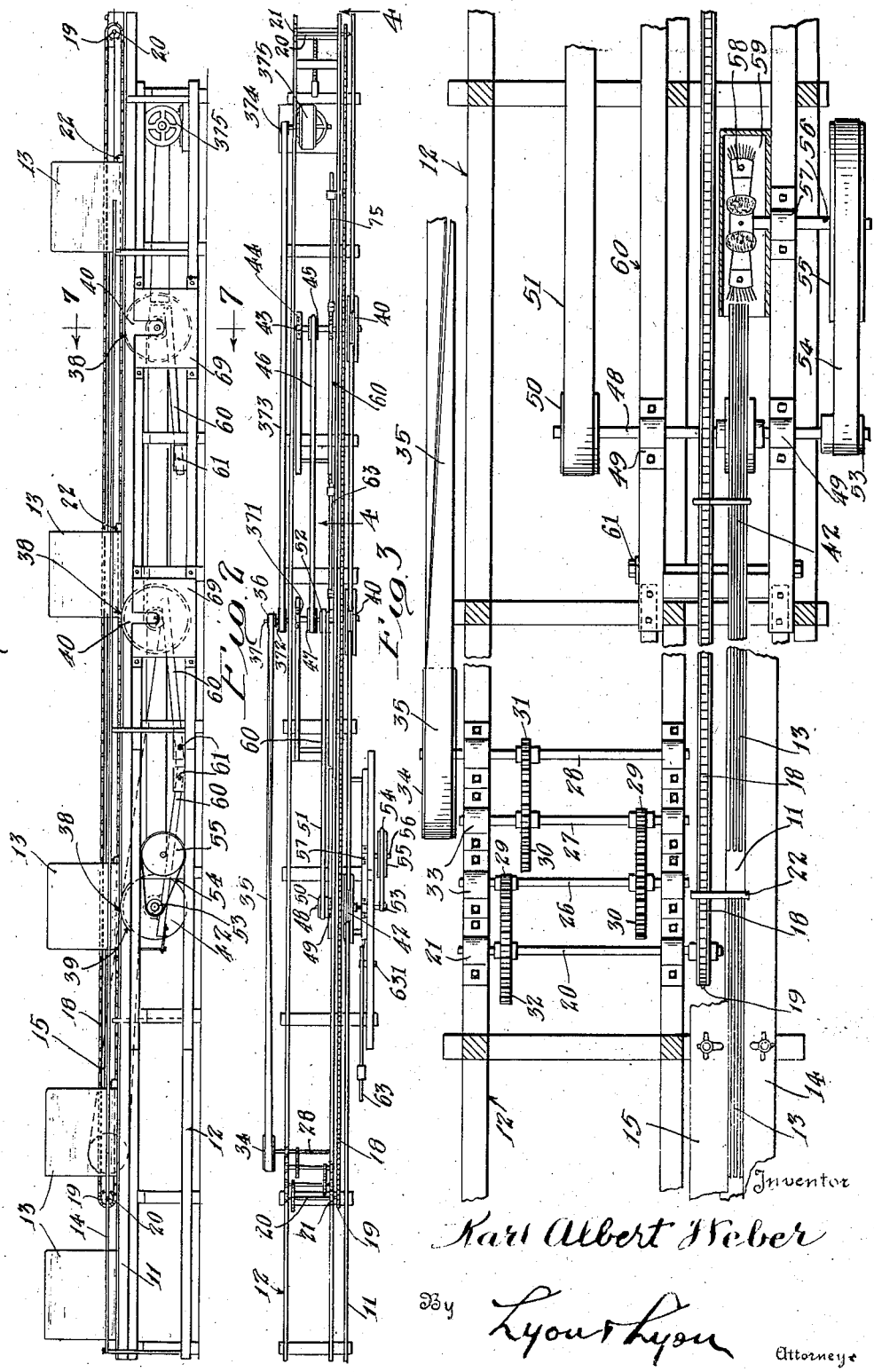

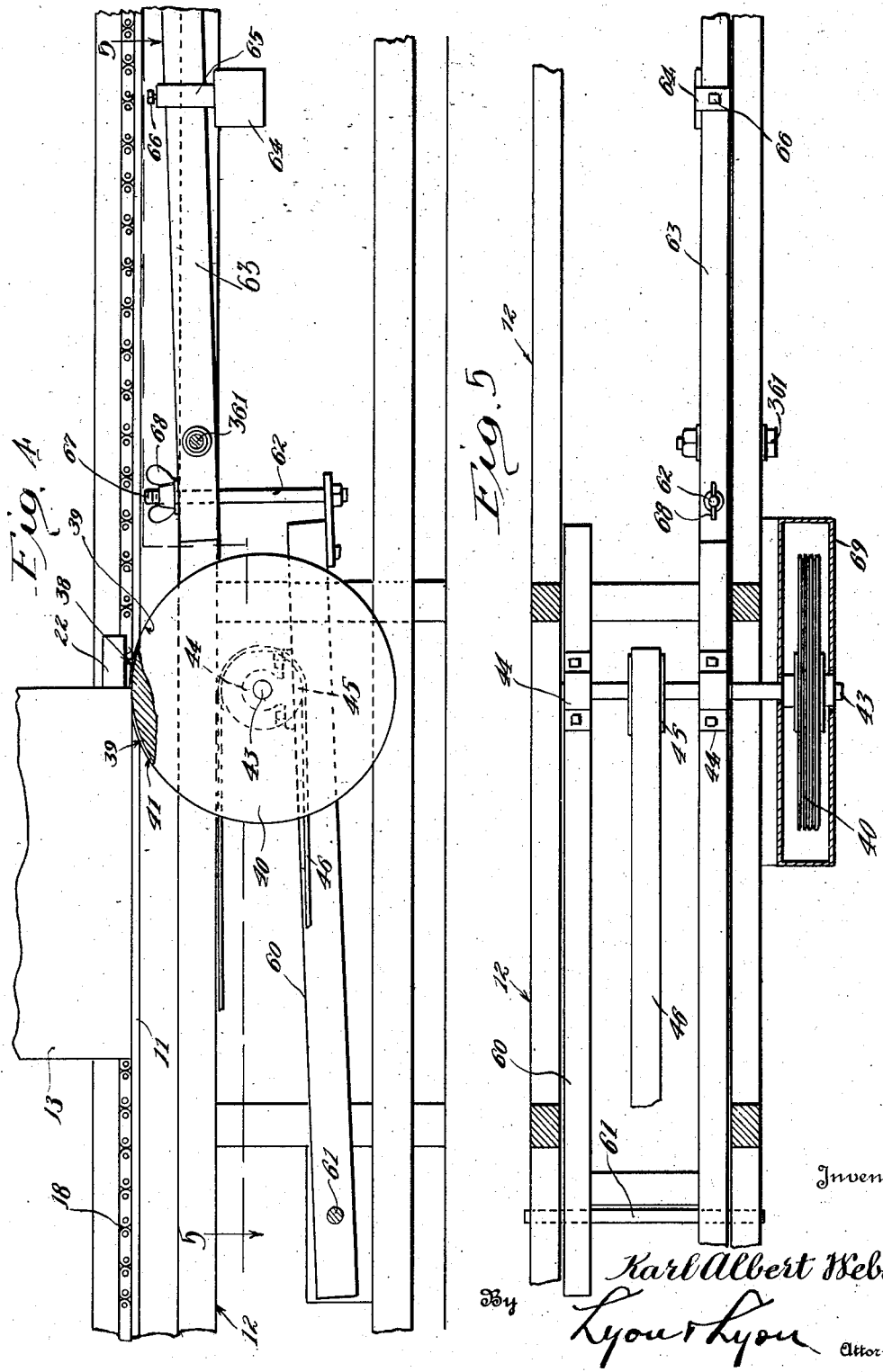

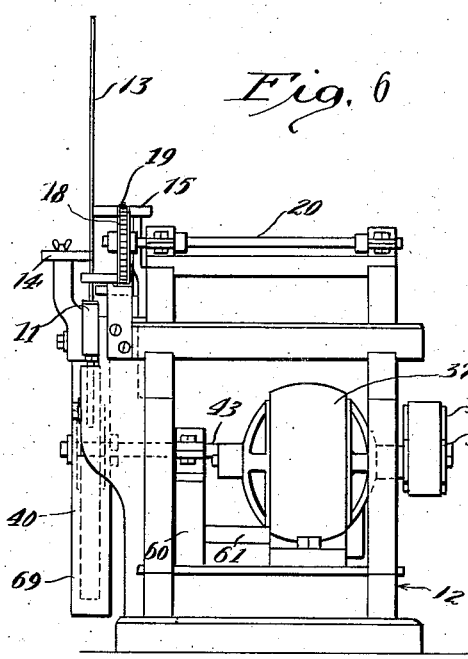
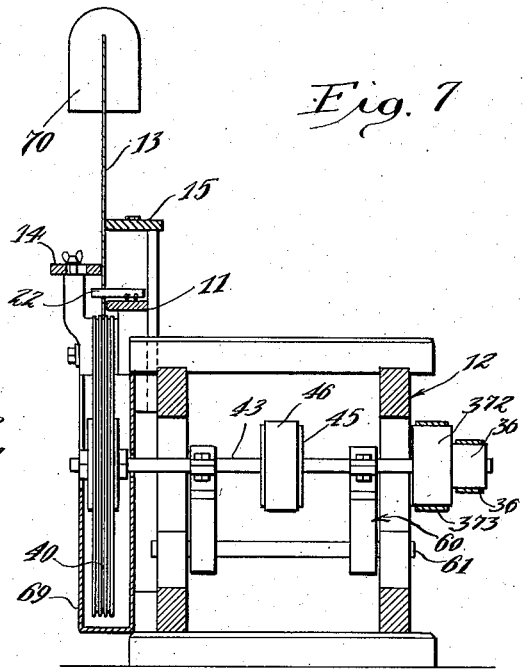
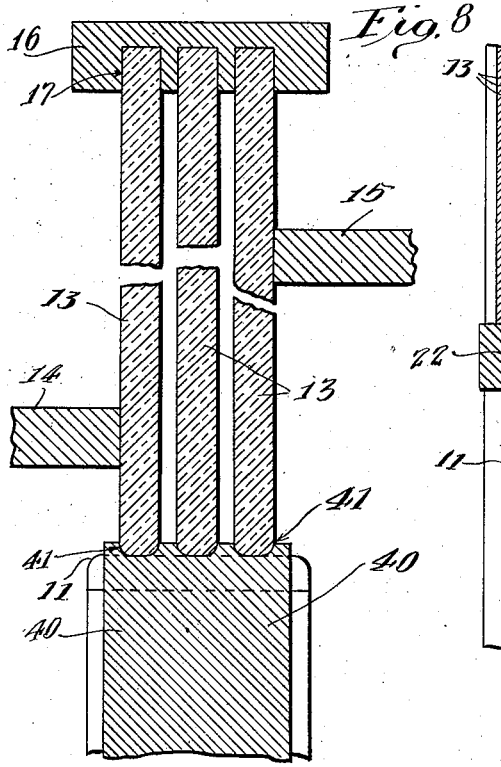
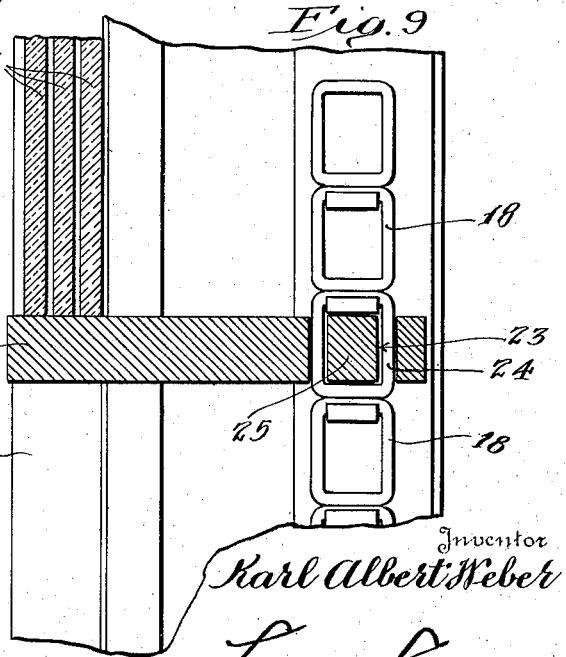

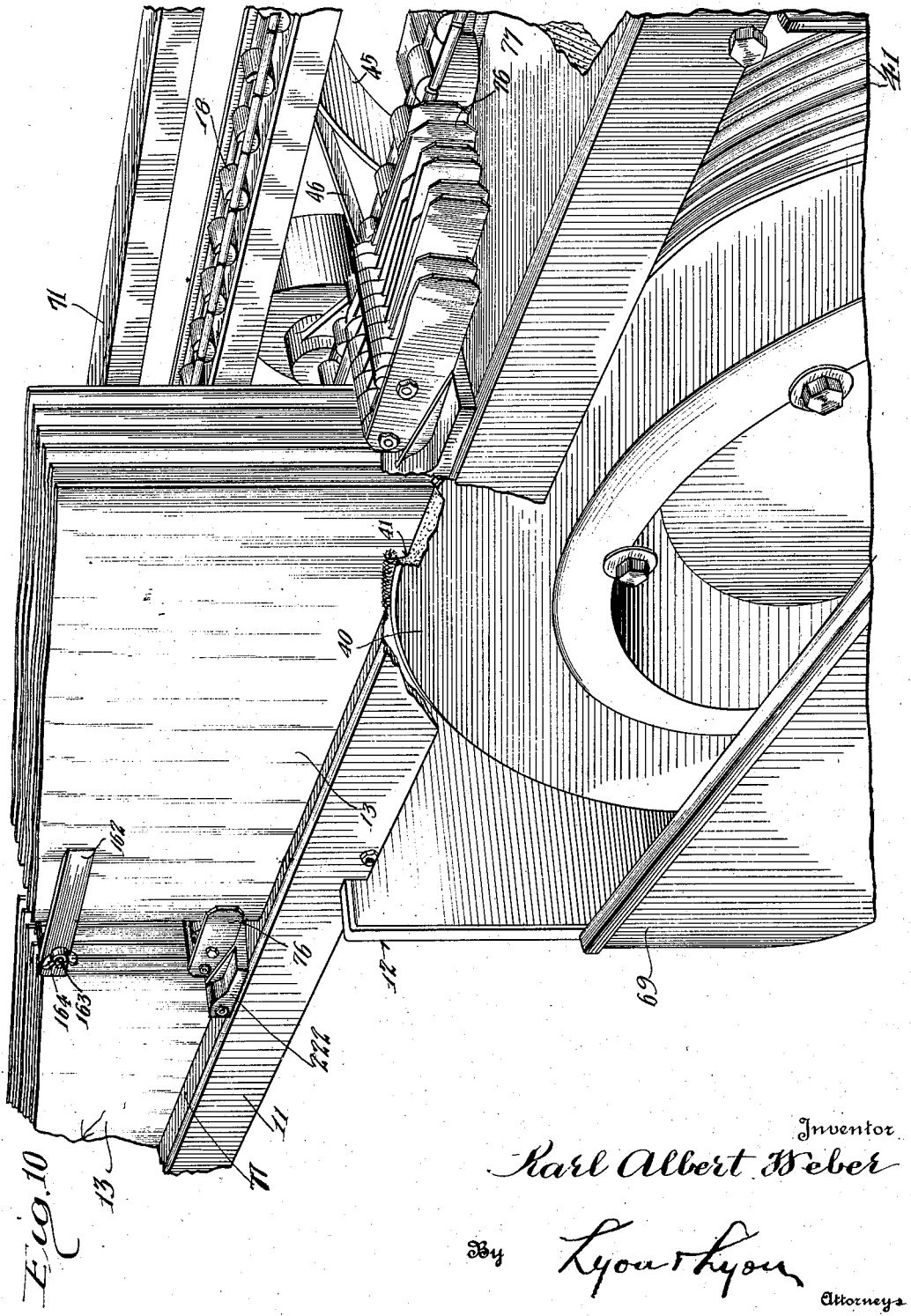

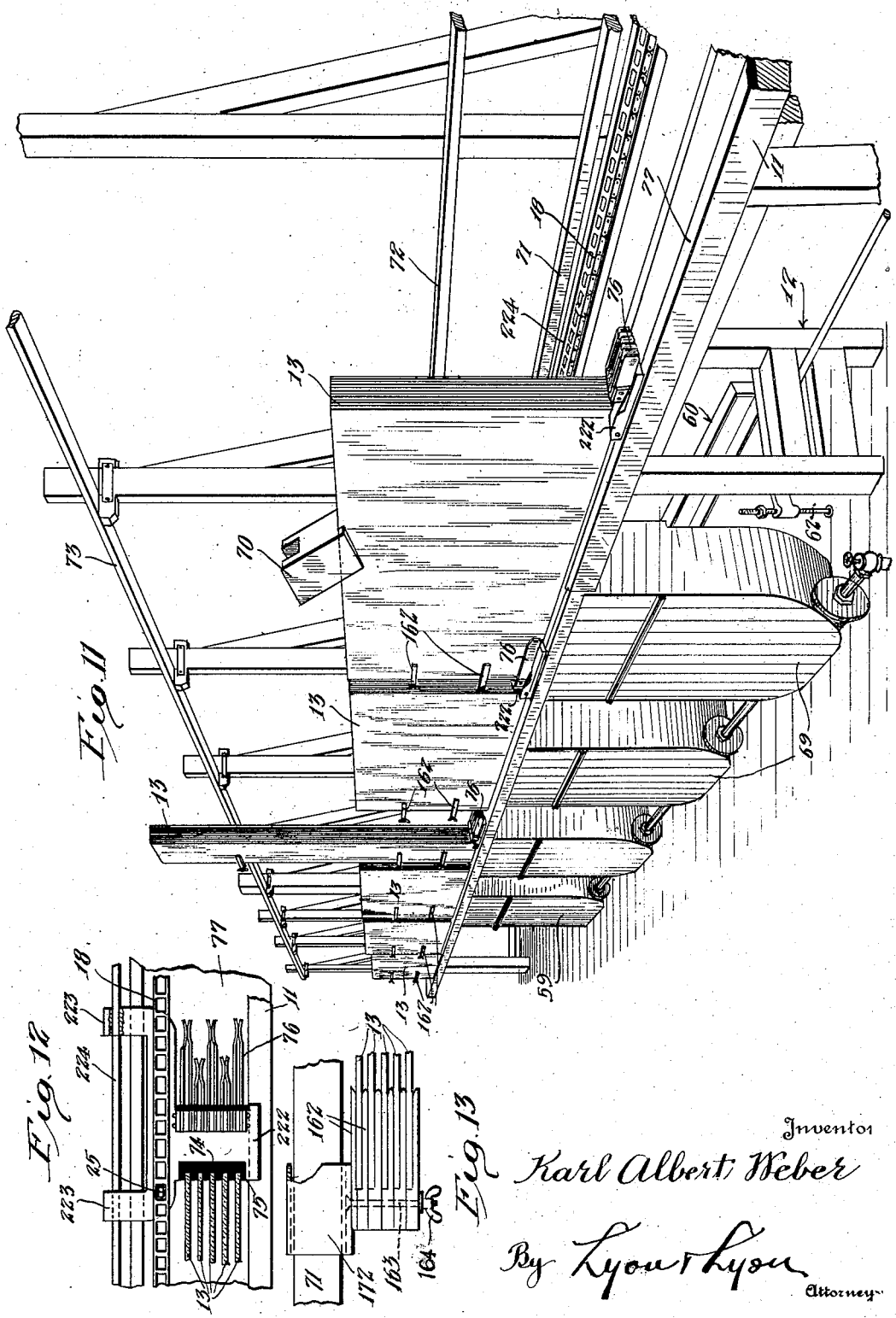

1,571,985

UNITED STATES PATENT OFFICE.

KARL A. WEBER, OF LOS ANGELES, CALIFORNIA.

MACHINE FOR GRINDING GLASS PLATES.

Application filed March 18, 1924. Serial No. 700,035.

*To all whom it may concern:*

Be it known that I, KARL A. WEBER, a citizen of the United States, residing at Los Angeles, in the county of Los Angeles, State of California, have invented a new and useful Machine for Grinding Glass Plates, of which the following is a specification.

This invention relates to the art of grinding, polishing, beveling or finishing the edges of glass. In this specification the term "glass" is used in a generic sense to define glass and other substances that may have more or less the characteristics of glass or may be substituted or used in the place of glass. The usual methods of grinding, polishing, beveling or finishing the edges of glass plates used for showcases, windows, automobile windshields, shelves, and table or furniture tops, are very inefficient and expensive and involve the use of much human labor. The primary objects of this invention are to effect the grinding or the polishing, or the grinding and polishing, and hence the finishing, of the edges of glass plates expeditiously, economically, and in such manner as to produce materially better results than heretofore.

At present, the method of grinding or polishing the edges of plates of glass, in general use, is for the operator to manually support and move the plate edgewise to and fro upon the edge of a grinding or polishing wheel. Many glass plates are broken in this manner and considerable skill is required to produce even a moderately straight edge; skilled workmen are therefore required. When a comparatively short plate is being handled, it can be run from end to end of the wheel by a single operator without stopping, but it is practically impossible for the operator to maintain a uniform speed in the feed of the plate. This produces an uneven edge. Many plates are of considerable length and, in running the edge along the wheel, at least two men are required to hold the plate and such plate is momentarily stationary at different times in the travel of the plate along the wheel. This is due partially to the necessity of the operator changing his position with relation to the plate as the grinding or polishing proceeds. This also produces an uneven edge.

Another object of this invention is to produce a perfectly straight edge, regardless of the length of the plate being ground.

Another object is to make the grinding, polishing, beveling or finishing operations entirely automatic so as to eliminate such variations as occur in so grinding, polishing, beveling or finishing the edges of plates by hand. Another object of the invention is to provide an organized machine of large capacity in which the said finishing operation may be completed with the minimum of human labor; also to obviate the necessity of skilled labor.

Another object is to provide such an organized automatic machine in which the liability to breakage of the glass plates or of the chipping or fracture thereof during the grinding, polishing, beveling or finishing, is substantially eliminated.

Other objects of the invention will hereinafter appear from a detailed description of a preferred embodiment of such invention, and such a preferred embodiment is illustrated in the accompanying drawings, wherein:

Figure 1 is a side elevation of a glass grinding, polishing or finishing machine embodying this invention, plates of glass being shown in position for grinding and polishing in the machine.

Fig. 2 is a plan view of Figure 1, the glass plates and guides being omitted.

Fig. 3 is an enlarged fragmental plan view of that portion of the machine shown on the left in Figures 1 and 2. Glass plates are shown in position in the machine.

Fig. 4 is an enlarged fragmental side elevation of the machine from the line indicated by 4—4 of Figure 2, portions being in section on said line, and one of the grinding wheels being shown partly in elevation and partly in section. A fragment of a glass plate is shown in grinding relation with the wheel.

Fig. 5 is a plan view, partially in section, from the line indicated by 5—5, Figure 4.

Fig. 6 is an enlarged end view of the machine from the right of Figures 1 and 2.

Fig. 7 is an enlarged sectional elevation on the line indicated by 7—7, Figure 1.

Fig. 8 is a fragmental sectional detail of one of the grinding wheels, the guides for the glass plates and one of the spacing members for said plates. Fragments of three plates are shown in place on the grinding wheel between the guides. The plates are engaged by the spacing member.

Fig. 9 is a fragmental detail of the plate-feed means and one of the rails upon which the glass plates travel. Fragments of three plates are shown engaged by the feed means.

Fig. 10 is a sectional perspective view.

Fig. 11 is a perspective view.

Fig. 12 is a sectional plan view illustrating in detail the construction and cooperative arrangement of the rails or bed on which the glass plates travel, the conveying means, and a preferred construction of means whereby the conveying means move the glass plates while the same are held in position in the machine.

Fig. 13 is a detail view illustrating a preferred form of positioning and spacing means which may be used upon a glass plate or series of plates at a suitable distance above the rails or bed-plate upon which the glass plates travel, and whereby tipping or tilting of the glass plates may be prevented.

Means are provided for properly supporting the plates to be ground and such means may be constructed as follows:

There are provided rails 11 alined with one another and suitably supported on a frame which is indicated in general by the character 12. The frame 12 may be constructed of wood or any other suitable material and the members thereof may be variously arranged to suit various requirements. A detailed description of the frame is unnecessary, since any one skilled in this art can readily make the same. The rails 11 are provided for the purpose of slidably supporting the glass plates which are to undergo the operations for the effecting of which the machine is constructed, and the glass plates are indicated at 13. The rails 11 may, is desired, be of sufficient width to support a plurality of the glass plates 13 side by side, as shown in Figure 9. The rails 11 are preferably constructed of non-metallic material and I have employed for this purpose strips of wood. The employment of metal for the rails 11 is inadvisable, since the edges of the plates are uneven before grinding and a certain amount of vibration is imparted to the plates 13 while being ground and, if the plates were to rest upon metal rails, they would be liable to crack or break. The wooden rails cushion the glass plates to some extent and the upper face of the rails will accommodate itself to irregularities in the edges of the plates so as to properly loosely support the plates along all portions of the bottom edges. This continuous support insures against cracking and breakage of the plates.

The plates 13 are supported by the rails 11 between guides 14, 15. When the plates are placed in the machine in single file, as shown in Figures 6 and 7, the guides 14, 15 engage the opposite faces of the plates, thus preventing lateral motion of the plates or change in angle between said plates and the rails. When a plurality of plates are placed side by side in the machine, as in Figures 3, 8 and 9, the guide 14 engages the outer face of the plate on one side and the guide 15 engages the outer face of the plate on the opposite side. When the plates are positioned side by side in this manner, it is advisable to employ spacing means to hold the plates spaced from one another. For this purpose I have shown a member 16, which may be constructed of wood or other suitable material, provided with a series of notches 17 to fit the edges of the plates 13, as clearly shown in Figure 8.

Means are provided to feed the plates 13 along the rails 11 and such means may be of any suitable construction within the scope of the invention as broadly defined in some of the appended claims. In this particular instance, for this purpose, there is provided an endless sprocket chain 18 engaging sprocket wheels 19 on shafts 20 positioned near the opposite ends of the frame 12, the shafts 20 being journaled in bearings 21. The sprocket chain 18 is provided at intervals with laterally extending arms 22 constructed of wood or other suitable material. The arms 22 may be secured in any suitable manner to the sprocket chain and, in this instance, each arm is provided in its under face with notches 23 which engage the side members 24 of one of the links of the chain 18, as clearly shown in Figure 9. The arm portion 25 between the notches 23 constitutes a plug which snugly fits inside of the link and is alone sufficient to hold the arm securely. The arms 22 project over the rails 11 and somewhat above said rails and are adapted to engage the rear edges of the glass plates 13 so that, when the chain 18 is operated to advance the arms 22, said arms will push against the plates and slide them along the rails 11. When the arms 22 have advanced a distance necessary to complete one feeding movement thereof, said arms may be removed from the chain, and re-engaged with said chain at a point where they will engage the rear edges of glass plates prior to feeding said plates to the grinding devices. Such removal and replaceal of the arms 22 will be done by the operator of the machine.

To operate the chain 18, speed reduction gearing is provided consisting of a number of shafts 26, 27, 28, the shafts 26, 27 being provided with spur pinions 29 and spur gears 30, the shaft 28 being provided with a spur pinion 31 and the shaft 20 with a spur gear 32. The shafts 26, 27, 28 are journaled in bearings 33 carried by the frame. The shaft 28 is driven by a pulley 34 over which runs an endless belt 35 that is driven by a pulley 36 on a shaft 37 journaled in bearings 371. On the shaft 37 is a pulley 372 driven by an endless belt 373 engaging the pulley 374 of a motor 375. It will be obvious that the plate feed means may be driven in any other suitable manner, if desired.

The adjacent ends of adjacent rails 11 are spaced from one another as indicated at 38, and the ends of the rails may be beveled on their under faces as indicated at 39. Moving in some of the spaces 38 are grinding elements 40 which, in this instance, are wheels provided in their edges with grooves 41 adapted, as the plates move across said openings, to engage the bottom edges of the plates 13, as clearly shown in Figure 4.

From the foregoing, it will be seen that the construction described enables me to effect relative longitudinal motion between the plate and grinding elements. While such construction has been described to enable those skilled in this art to build the machine, it is to be understood that other means for accomplishing such motion may be employed within the scope of the invention as defined in some of the appended claims. As the plates move across the final space 38, they engage a polishing element 42 which moves in said space. The polishing element 42 may be a wheel constructed in the usual manner of polishing wheels and it is therefore unnecessary to describe said wheel in detail herein. One of the wheels 40 is mounted on the shaft 37 and the other wheel 40 is mounted on a shaft 43 journaled in bearings 44. The shaft 43 is provided with a pulley 45 driven by a belt 46 which is driven by a pulley 47 mounted on the shaft 37. The wheel 42 is mounted on a shaft 48 journaled in bearings 49. The shaft 48 is provided with a pulley 50 driven by an endless belt 51 which is driven by a pulley 52 mounted on the shaft 37. The shaft 48 is provided with a pulley 53 driving a belt 54, which in turn drives a pulley 55 on a shaft 56. The shaft 56 is journaled in a bearing 57 and carries a rotary brush 58 which engages the edge of the wheel 42 so as to supply said edge with a polishing solution contained in a tank 59.

The shafts 37, 43, 48 are preferably adjustably mounted relative to the rails 11, and the adjustment may be effected by any suitable construction. In this particular instance, the construction for effecting the adjustment is as follows: Each pair of bearings for the shafts 37, 43, 48 is mounted on a carriage 60 pivoted at 61 to the frame. Means are provided to move the carriages 60 toward and from the rails 11 and preferably such means include counterbalances so as to automatically press the wheels 40, 42 against the bottom edges of the glass plates with a predetermined degree of pressure, thus to effect a definite depth of grinding of the edges of the glass plates. For this purpose each of the carriages 60 is connected by a rod 62 to one end of a lever 63 which is provided with an adjustable weight 64. The weights 64 are connected with the levers 63 by collars 65 shiftable along the levers and said collars are releasably held in any desired position of adjustment by set-screws 66. The rods 62 may be provided with screw-threads 67 engaged by wing nuts 68, thus providing one form of means for effecting relative adjustments between the carriages 60 and their operating levers 63.

Each of the wheels 40 is provided with a tank 69 mounted on the frame to hold water for the wheel to run in. The tank 59 and bearing 57 are preferably mounted on the carriage 60 that is associated with the polishing element 42.

In the drawings the relative arrangement of the rails 11 and grinding wheels 40 is such as to produce unbeveled edges on the glass plates, but it is to be understood that the invention is not limited to such arrangement, since, by tilting either the grinding wheels or the plates, a beveled edge could be produced.

In Figures 10 to 13 inclusive the same general preferred embodiment of the invention is illustrated. It may be preferable, in place of utilizing the form of spacing and positioning member 16 illustrated in Figure 8 and the rails or guides 14, 15 by which the plates are held in the desired position with relation to the grinding or polishing operation, to employ the equivalent thereof. One form of such an equivalent is shown. A track or a series of tracks 71, 72, 73 may be arranged at such vertical heights as to adapt the machine for simultaneously grinding or polishing pieces or plates of glass, marble, vitrolite, or the like, of various dimensions, and the positioning means may include a track-embracing member 172 carrying positioning, supporting or spacing means 162. Such means 162 are preferably mounted upon a threaded arm 163 and retained in position thereon by suitable fastening means, such as the wing nut 164. By this means, when the machine is used to grind or polish single plates, such a plate may be positioned and supported between adjacent supporting and positioning bars or arms 162, of which there may be any desired number to provide for the support of the desired number of plates forming the series of plates, when the machine is operated upon a series or gang of plates.

In place of using the arms 22, the means for impelling the plate or plates through the machine may consist of a bracket 222, provided with an arm or arms 223 adapted to embrace and ride upon a rail 224 by which the bracket is guided and positioned. This bracket is provided with a shoulder or projection 25, adapted to project inside of a link of the chain 18. Preferably, the forward portion of the bracket proper is provided with a soft rubber spacing means 74, provided with notches to receive the rear end of the glass plate or plates. Preferably, the opposite or rear face of the bracket carries means for supporting or holding the glass plate or plates at their forward ends. This latter means preferably comprises gripping members 76, of spring metal, adapted to adjust themselves to any variance in thickness of the glass plates.

When the arm or arms 223, reach the end of a feeding movement as the chain 18 rises around the sprocket it will automatically become disengaged from the arm or arms as the projection 25 will pass out of the length of the chain which it had engaged. The arms 223 may then be removed from the rail 224, and replaced on said rail with the projection engaging a length of the chain 18 at a forward portion of the chain in order to be in a position for feeding a new supply of glass plates into operative relation to the grinding devices.

Preferably, the rails 11 upon which the glass plates slide are faced with a suitable rubber surface 77 whereby any tendency to chipping or breaking of the glass plates due to any vibration caused by contact with the grinding elements is further obviated.

The grinding and polishing wheels are illustrated in the drawings as having grooves 41 corresponding to the shape and degree of grinding desired to be imparted to the edge and side of the plate. However, it is obvious that if it should be desired merely to grind the end surface of the plate and smooth and polish it, the grinding wheels 40 could be used without grooves and thereby the plates would be ground on the edge of the wheels. It may be desirable, in such a case, to mount the wheels at an angle to the travel of the glass plates 13 to insure the grinding of a square edge, instead of mounting the grinding wheels to rotate in the line of travel of the plates. In certain installations, it may be preferable to mount the grinding wheels 40 on shafts that are held at an angle to the horizontal, to grind a beveled edge on the plate, or the glass plates may be ground by suitable means substantially similar to those shown herein, and supported at an angle, where it is desired to produce a beveled edge; such support and mounting being in such a manner that the weight of the plates is utilized to hold the plate in grinding relation to the wheel without the necessity of fixed clamps fixedly holding the glass plates, and thereby avoiding vibrations of the plates causing breakage thereto at the points of such fixed support.

A machine embodying this invention may be operated to perform the desired function and obtain the desired results as follows:—

An attendant will place the plate, or a series or gang of plates, on the rail 11, or on the rubber surface thereof if a rubber surface be used, at the right-hand end of the machine, as indicated in Figure 1, in front of the arm 22 and with the front end of the plate engaged between the corresponding gripping members 76. The travel of the sprocket chain moves the arm 22 forward, pushing the plate along the rail, thence across the opening 38 between the rail and the next adjacent rail and into contact with one of the grinding wheels 40, the plate resting a material portion of its weight upon the grinding wheel and, being free to vibrate while being ground, the grinding is accomplished without the danger of chipping or breaking of the glass due to the vibration and the localization thereof upon points of fixed support. The grinding wheels 40, 42 are preferably driven in a direction opposite to the direction of travel of the chain 18, and thus the plate or plates will travel only as fast as the arm 22 propels them against the friction of the wheels on the plate.

Any number of grinding or polishing wheels may be provided as desired and to accord with the speed of operation to be obtained, and the amount of grinding that it is desired to effect with each wheel.

In some instances, the plates to be ground may be of such lightness as to require a suitable weight 70 hung on the plate, as indicated in Figures 7 and 11. This weight may be, for example, a bag of sand or a piece of lead. The relation between the weight of the plate, or of the plate plus that of the weight 70 (where such weight is employed) and the weight of the counterweight 64 and the length of the lever arm acted upon by the weight 64 is such that a predetermined degree of pressure is caused between the wheel 40 and the plate, and this pressure determines the amount of glass that will be ground away by each of the wheels, so that after a plate has passed through the machine its ground edge will be straight and smooth. If a greater grinding pressure is desired, the weight 64 may be adjusted further away from the pivot 361 of the lever, and if less grinding is desired, the weight may be adjusted closer to the pivot 361.

As the glass plates move through the machine they are ground successively by engaging the different grinding wheels and the plates finally engage the polishing wheel which puts a polish on the edge being operated upon.

In certain installations, as for example where a constant pressure may be employed, the grinding wheel or wheels may be set in stationary bearings and arranged so that the pressure between the glass plate and the grinding wheel is variable only by the variation in the weight of the glass plate or by the variation of the weight 70 added to the glass plate.

While I have illustrated in the drawings a preferred embodiment of the invention well adapted for the purposes described, it is obvious that the invention is not limited to any of the details of construction illustrated or described, and that various and many modifications and substitutions may be made without departing from the spirit of the invention, which is of the scope set forth in the appended claims.

I claim:—

1. A machine for grinding an edge of a glass plate comprising a line of support upon which the glass may be stood on edge in a substantially vertical position, means for guidingly maintaining it in such position, and grinding means moving in the line of feed of the glass and located substantially on a level with said line of support and onto which the glass moves and by which it is supported on edge while being ground.

2. A machine for grinding the edge of a glass plate comprising a line of support upon which a glass may be stood on edge in a substantially vertical position, means for guidingly maintaining it in such position, and grinding means having a groove, shaped to grind the edge of the plate and surfaces adjacent said edge to finish and shape the same as predetermined, said grinding means moving in the line of feed of the glass and located substantially on a level with said line of support and onto which the glass moves and by which it is supported on edge while being ground.

3. A machine for grinding the edge of a plurality of glass plates, comprising a line of support upon which said glass plates may be stood on edge in substantially vertical position, means for guidingly maintaining the plates in such position, and grinding means moving in the line of feed of the glass and located substantially on a level with said line of support and onto which the glass moves, and by which it is supported on edge while being ground.

4. A machine for grinding the edges of a plurality of glass plates, comprising a line of support upon which said plates may be stood on edge in a substantially vertical position, means for guidingly maintaining said plates in such position, and a plurality of grooved grinding devices moving in the line of feed of the glass plates and located substantially on a level with said line of support and onto which said plates may, and by which they are supported on edge while being ground.

5. A machine for grinding the edges of a plurality of glass plates comprising a line of support upon which said plates may be stood on edge in a substantially vertical position, spacing and supporting means for said plates guided by suitable tracks, and grinding means moving in the line of feed of the plates and located substantially on a level with said line of support and onto which said plates may, and by which they are supported on edge while being ground.

6. A machine for grinding the edges of glass plates, comprising a line of support upon which said plates may be stood on edge in substantially vertical position, means for maintaining said plates in such position and for holding them in groups evenly spaced from each other, means for feeding the groups of plates through the machine in the direction of their forward edges, and grinding means located in the path of movement of said plates and substantially on a level with said line of support and onto which said glass plates move, and by which they are supported on edge while being ground.

7. A machine for grinding the edges of glass plates, comprising a line of support upon which said plates may be stood on edge in a substantially vertical position, means for guidingly maintaining said plates in such position, means for advancing said plates and for holding them in spaced relation while being so advanced in the direction of their forward edges, grinding means moving in the line of feed of the glass plates and located substantially on a level with said line of support and onto which the glass plates may, and by which they are supported on edge while being ground, and counter-balancing means to relieve said plates of some of their effective weight for controlling the pressure of said plates or said grinding means during the grinding operation.

8. A machine for grinding an edge of a glass plate, comprising a line of support upon which the glass may be stood on edge in a substantially vertical position, means for guidingly maintaining it in such position and for feeding it longitudinally relative to a grinding device, a rotary grinding device having a portion of its edge moving in the line of feed of the glass and located substantially on a level with said line of support and onto which the glass moves, and by which it is supported on its edge while being ground.

9. A machine for grinding an edge of a glass plate, comprising a line of support upon which the glass may be stood on edge in a substantially vertical position, means for guiding and for maintaining it in such position, means for feeding the glass longitudinally, and grinding means located substantially on a level with said line of support and onto which the glass moves and by which it is supported on edge while being ground.

Signed at Los Angeles, California, this 4th day of March 1924.

KARL A. WEBER.